(No Model.)

D. H. McCLELLAND.
OIL PURIFIER.

No. 498,184. Patented May 23, 1893.

WITNESSES

INVENTOR.

UNITED STATES PATENT OFFICE.

DAVID H. McCLELLAND, OF WASHINGTON, DISTRICT OF COLUMBIA, ASSIGNOR OF ONE-HALF TO SAMUEL W. CURRIDEN, OF SAME PLACE.

OIL-PURIFIER.

SPECIFICATION forming part of Letters Patent No. 498,184, dated May 23, 1893.

Application filed December 22, 1892. Serial No. 456,091. (No model.)

*To all whom it may concern:*

Be it known that I, DAVID H. MCCLELLAND, a citizen of the United States, residing at Washington, in the District of Columbia, have invented certain new and useful Improvements in Oil-Purifiers, of which the following is a specification.

My invention relates to oil filters or purifiers, by which refuse lubricating oil is cleansed and made available for further use by being caused to pass through a liquid purifying medium; and has for its object to cheapen the construction of such apparatus and particularly to provide an efficient means of cleansing it when it becomes foul after continued use.

With this object in view, I provide an apparatus having an inverted conical bottom with a tap at the lowest point of the cone; whereby all refuse matter taken up by the oil is precipitated into the immediate vicinity of the tap. Furthermore, I introduce the ordinary steam pipe used in cleansing in such manner as to cause a rotation of the liquid purifying medium whereby the matter which it is desired to separate from the oil is collected near the center of the rotating mass and thus is more easily removed by the tap.

In my improved apparatus the steam jet pipe introduced in this manner has several functions, namely, to cause the circulation of the purifying medium while the oil to be purified is passing through it thereby facilitating the separation of the sediment or other impurity from the oil; to heat the said medium and render the oil more fluid and more easily separated from its impurities; by condensation to increase the bulk of the liquid purifying medium and permit a part of the latter to be drawn off periodically or as may be desired carrying with it the sediment; and by the particular motion given to the purifying medium to collect at the center of the base of the vessel or tank and immediately over the draw-off pipe the sediment to be discharged.

The manner of constructing and using my invention is pointed out fully in the accompanying specification, while the elements of novelty are set forth in the claims.

In the accompanying drawings hereby referred to and made part of this specification, which shows an embodiment of my invention, the same letters refer to like parts in the different views; and therein—

Figure 1:
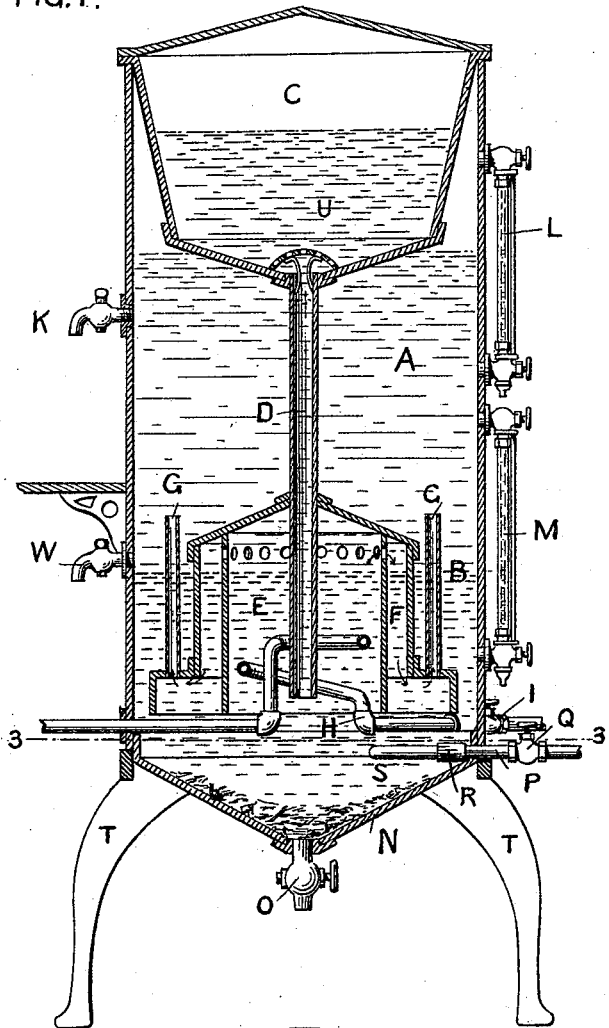
Figure 2:
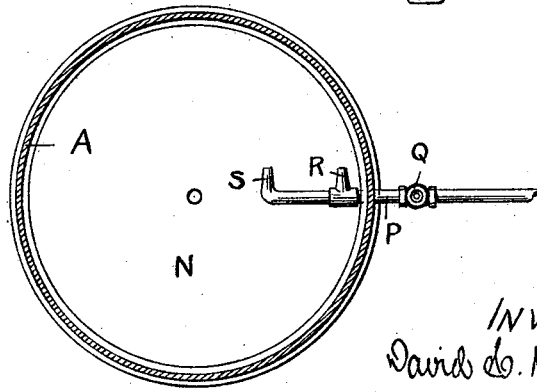

Figure 1— is a vertical section and Fig. 2— a sectional plan upon the line 3—3 of Fig. 2.

Referring by letter, A represents the body of the receptacle used to contain the oil to be purified, which is of such capacity as may be desired; in the one represented, it is of sufficient size to hold about a barrel of oil and the same quantity of purifying medium, such as water or a mixture of water with milk of lime, or any similar well known purifying medium, of which a sufficient quantity to fill the receptacle to the water line B should be employed.

C is the hopper into which the oil to be purified is poured, and from which it runs into the purifying medium through the pipe D, which is provided at its upper end with a proper strainer U.

E is a chamber into which the oil is discharged from the pipe D; $e\,e$ are perforations in the upper end of this chamber through which the oil again passes into an outer bell F, having a slanting top V, which allows any sediment to descend to the bottom, after passing down through which, it is discharged upward through the pipe G, and passes into the upper part of the receptacle, from which it may be drawn off through the oil tap K. The walls of said chamber E and bell F constitute means whereby the passage of the oil through the purifying medium is directed or retarded so as to facilitate and perfect the separation of the oil from the sediment.

In the bottom portion of the chamber E, is a heating coil of steam pipe H, passing through the side walls of the apparatus, and provided with the valve I, by means of which the temperature of the purifying medium may be regulated. The apparatus is also provided with a second steam-pipe P, having a valve Q, and terminating in a nozzle S turned to one side or the other of the pipe; there is also a second outlet or nozzle R, turned in the same direction as the nozzle S. It is manifest that the pipe may enter the side of the vessel on a line at an angle to its radius with equal effect, the object to be attained being to discharge the steam tangentially into the receptacle and cause its contents to rotate. The bottom N of the receptacle is shaped like an inverted cone and is provided with a large valve O; the office of the steam pipe B is principally to cause a circulation of the purifying medium to facilitate the separation of the oil from its sediment, and to collect the sediment at the center of the base of the apparatus directly over the draw-off pipe and ready for removal as described.

The tap W is provided at a trifle above the water line B, so that all of the oil may be drawn off when the receptacle is to be cleansed. Two gages L and M are arranged so as to show the height of the oil and of the water respectively. The whole apparatus is mounted upon legs T T.

The operation of the device is as follows:— The oil poured into the hopper C descends through the pipe D, passing three times, by means of the chamber E, the bell F and the pipes G G, through the purifying medium, upon the top of which it collects and is ordinarily drawn off through the tap K.

In the mean time the purifying medium is constantly or periodically circulated by the entrance of steam through the nozzles R and S, aiding in the separation of the oil and impurities and collecting the latter in the form of sediment at the center of the base of the tank and over the draw-off pipe. When it is desired to clean the purifier the valve O is opened and all accumulated sediment is discharged together with a portion of the purifying medium. The latter is replaced by condensation of the steam from the pipe P or by liquid poured into the top of the tank, or by both, and the operation proceeds as before. In cleaning the apparatus the greater part of the oil and of the purifying medium, or the entire contents of the machine, may of course be removed if desired, but the method first above described is more convenient and preferable and that which in practice I follow.

I am aware that it is not broadly new to introduce a liquid or to introduce steam tangentially into a vessel for the purpose of causing a rotary motion therein, and I do not wish my claims to be understood as extending broadly to a combination of devices for effecting such purpose, my invention having relation only to an oil purifier in which the oil is purified by being caused to pass through a liquid cleansing medium.

What I claim as my invention, and desire to secure by Letters Patent of the United States, is—

1. In an oil purifier, the combination with the tank or vessel having an inverted conical or depressed bottom and adapted to hold a liquid purifying medium in its lower part, of means for delivering the oil into the lower portion of said medium, the pipe P adapted to deliver steam tangentially into said medium, and a draw-off pipe in the center of the bottom of said vessel, substantially as set forth.

2. In an oil purifier, the combination with the vessel or tank adapted to hold a liquid purifying medium in its lower part, of means for delivering the oil into the lower portion of said medium, and for directing its passage therethrough the pipe P adapted to deliver steam tangentially into said liquid medium, the bottom of said vessel being formed in the shape of an inverted cone, and a draw-off pipe leading from the apex of the conical bottom, substantially as set forth.

In witness whereof I have hereunto set my hand in the presence of two witnesses.

DAVID H. McCLELLAND.

Witnesses:
HENRY E. COOPER,
MARGARET V. COOPER.